United States Patent [19]

Haigh, deceased et al.

[11] Patent Number: 4,465,728

[45] Date of Patent: Aug. 14, 1984

[54] DYE DECORATED PLASTIC ARTICLES

[75] Inventors: John M. Haigh, deceased, late of Baton Rouge, La.; Johnathon Haigh, heir, Seabrook, N.H.

[73] Assignee: H.L.H. Corp., St. Charles, Mo.

[21] Appl. No.: 372,528

[22] Filed: Apr. 28, 1982

Related U.S. Application Data

[60] Continuation of Ser. No. 103,261, Dec. 13, 1979, abandoned, which is a continuation-in-part of Ser. No. 14,912, Feb. 26, 1979, abandoned, which is a division of Ser. No. 830,642, Sep. 6, 1977, Pat. No. 4,202,663, which is a division of Ser. No. 540,380, Jan. 13, 1975, Pat. No. 4,059,471, which is a continuation-in-part of Ser. No. 291,657, Sep. 25, 1972, Pat. No. 3,860,388.

[51] Int. Cl.³ .................. B32B 3/00; B41M 1/30; B41M 1/42
[52] U.S. Cl. ...................... 428/156; 8/471; 8/506; 264/78; 264/129; 428/195; 428/207; 428/913; 428/914
[58] Field of Search .................. 8/471, 506, 467, 512, 8/515, 520; 156/235, 240, 277, 244.6; 428/156, 172, 195, 202, 204, 207, 913, 914; 264/78, 129; 427/256

[56] References Cited

U.S. PATENT DOCUMENTS

| | | | |
|---|---|---|---|
| 3,502,495 | 3/1970 | Akamatsu | 117/38 |
| 3,860,388 | 1/1975 | Haigh | 8/471 |
| 3,868,214 | 2/1975 | Shackleton | 8/471 |

FOREIGN PATENT DOCUMENTS 546143  2/1974  Switzerland ........ 428/195

Primary Examiner—Bruce H. Hess
Attorney, Agent, or Firm—Thomas C. Stover, Jr.

[57] ABSTRACT

Plastic articles of thermoplastic or thermoset plastic are penetrated with dispersed dyes in one or more colors in clearly defined patterns, the penetrated portion or surface of the article being free of dye adhesive and dye carrier and in some cases having a surface texture imparted thereto.

17 Claims, 15 Drawing Figures

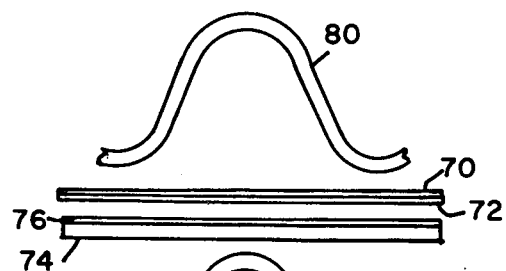
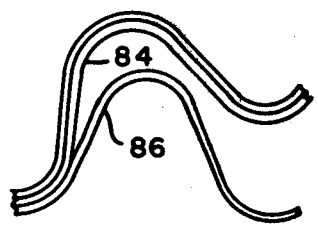
FIG. 5
FIG. 6
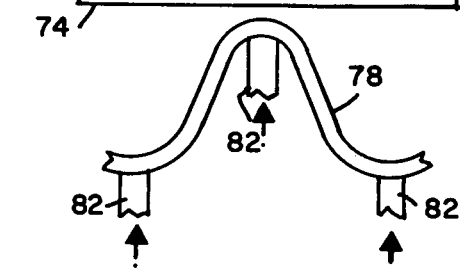
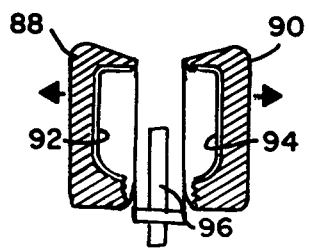
FIG. 7
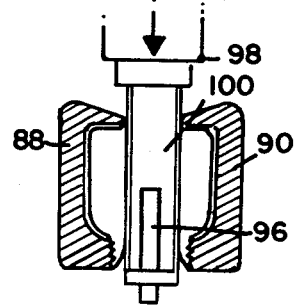
FIG. 8
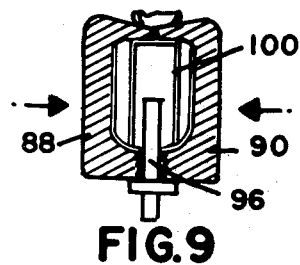
FIG. 9
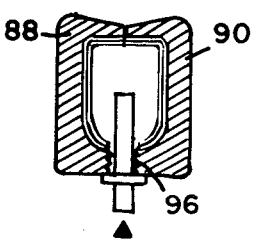
FIG. 10
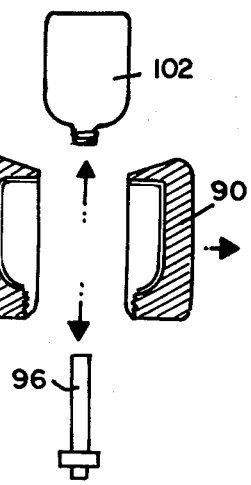
FIG. 11
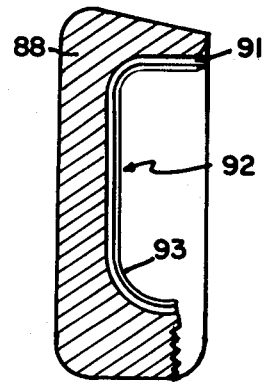
FIG. 12

DYE DECORATED PLASTIC ARTICLES

This application is a continuation of U.S. Pat. application Ser. No. 103,261, filed Dec. 13, 1979, now abandoned, which is a continuation in part of U.S. patent application Ser. No. 14,912, filed Feb. 26, 1979, now abandoned, which was a divisional application of U.S. patent application Ser. No. 830,642, filed Sept. 6, 1977, now U.S. Pat. No. 4,202,663, which was a divisional application of U.S. patent application Ser. No. 540,380, filed Jan. 13, 1975, now U.S. Pat. No. 4,059,471, which in turn was a continuation in part of U.S. patent application Ser. No. 291,657, filed Sept. 25, 1972, now U.S. Pat. No. 3,860,388, all by the same inventor.

BACKGROUND OF THE INVENTION

1. Field of the Invention

This invention relates to dye decorated plastic articles.

2. Prior Art

With the widespread use of plastic articles in business and in the home, the need for suitably decorating these articles is obvious, e.g., articles such as table and counter tops, wall paneling, furniture and the like. However, plastic surfaces have uniformly resisted printing and design applications and paper-printed designs laminated to plastic sheets have resulted as a substitute. This industry is referred to as high pressure decorative molding. As an alternative solution to the above difficulties, designs, colors, patterns, printing and the like have been applied to plastic sheets, particularly film, of necessity, by specially treating the plastic film surface, e.g., corona discharge treatment, printing on the film surface and adhering the film to the plastic sheet. This procedure requires numerous steps and difficulties are encountered such as rub-off of the printed matter from the film and difficulty in obtaining lay-flat and good adhesion of the film to the substrate. To avoid printed matter rub-off, the film has been frequently printed on the reverse side and the printed side adhered to the substrate, the printed matter being viewed through the film. This procedure, however, requires a transparent film and raises problems, including adhesion difficulties of the printed side of the film to the substrate.

Fabric decorating, on the other hand, has evolved to a well developed technology and patterns, colors and designs are readily imprinted thereon as follows. Design dyes are printed on so-called heat transfer papers, which papers are then placed against the desired fabric and heat and limited pressure (1 to 5 psig) applied and the dyes sublime into vapor form and transfer from the paper to fabrics, the design intact.

Although it has long been desired to apply the fabric design process to plastic materials, the translation has proved unworkable, since the heat required to sublime the dyes also is sufficient to soften the plastic receptor surface, as well as the dye adhesives on the transfer paper, and paper and plastic fuse together. This impediment has made the application of the fabric printing method to plastic materials practically impossible. There is, therefore, a need and market for a process for imprinting plastic materials in a durable, efficient manner, so as to obviate the above difficulties and for such imprinted plastic materials.

Some methods for overcoming these prior art difficulties are disclosed in applicant's parent applications and mentioned hereinabove. While the methods disclosed therein are satisfactory, other alternatives and improvements thereto are desirable.

SUMMARY OF THE INVENTION

There has now been discovered a dye decorated plastic article made by a method for transferring dye patterns, colors and designs to plastic materials in a permanent and durable manner, wherein sticking of transfer paper and plastic is avoided. The invention not only provides a dye decorated plastic article made by a method of printing plastic materials as readily as paper or fabrics; in addition, the article has its patterns, colors and designs fixed in such a manner that they penetrate the plastic material below the surface thereof, rendering the so-transferred designs wear and rub proof. Moreover, the dyes are transferred to the plastic receptor material free from dye adhesives and other vehicles and in greater concentration than possible with fabrics, producing plastics with designs of surprising clarity, definition and intensity.

These and other advantages and objects of this invention will become apparent from the ensuing descriptions of the invention.

In another embodiment, a molded decorated plastic article is provided comprising an article penetrated with pure dispersed dye therein in a pattern, the penetrated portion of the article being coating free and having a continuous uniform texture.

I. Dye Transfer

BRIEF DESCRIPTION OF THE DRAWINGS

FIGS. 3 to 15 will be discussed hereinafter.

PREFERRED EMBODIMENTS OF THE INVENTION

Figure 1:
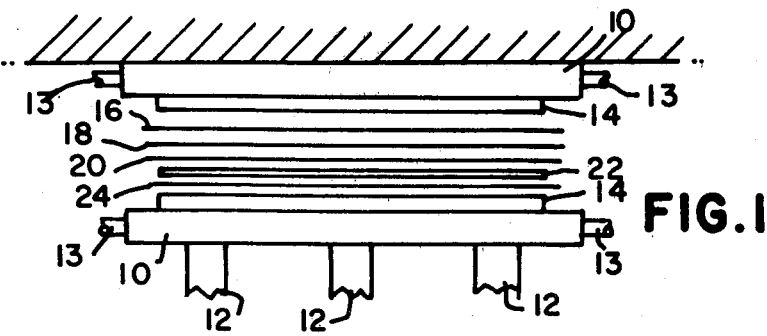
FIG. 1 is a partial sectional elevation view of the dye transfer apparatus embodying the present invention.

Referring now to the drawings, platens 10, heated and cooled by water ducts 13, have positioned therebetween smooth surfaced press platens 14, heat transfer printing paper 16, inert dye carrier sheet 18, dye receptor sheet 20, laminate base material 22, and a release sheet 24 as shown in FIG. 1. Hydraulic rams 12 press the platens and above sheets together to a desired pressure. Hot liquid is admitted to platens 10 by ducts 13 to apply heat to the composite stack of pressed sheets, sufficient to induce sublimation of the dyes on the heat transfer printing paper 16 through the carrier sheet 18 and on and into the receptor sheet 20 and at the same time to cause bonding of the receptor sheet 20 and the laminate base material 22. Subsequently, cooling water is fed into platens 10 by ducts 13 to cool the composite stack of sheets, after which the platens are opened and the sheets removed, i.e., the paper 16 and carrier sheet 18, e.g., polyethylene, adhere together and are removed as one. The carrier sheet 18 is readily removed from the receptor sheet 20. The dye receptor sheet 20 adheres to the laminate base sheet 22, forming the printed plastic product embodying the invention, and is removed from the platen as one. The release sheet 24 is readily removed from the back of the laminate base sheet.

Figure 2:
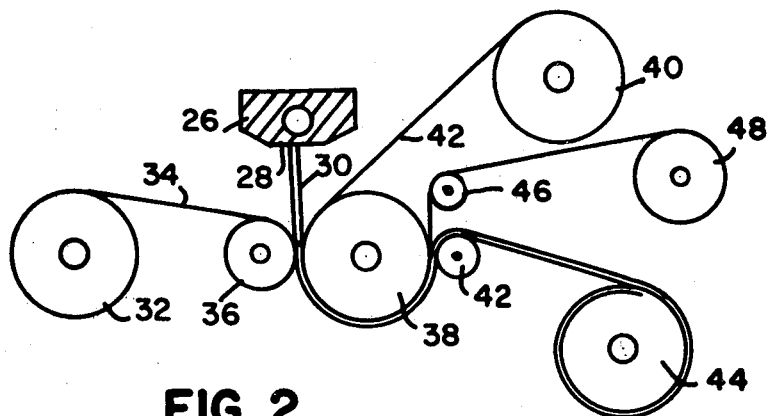
FIG. 2 is a schematic diagram of a dye transfer process embodying the present invention.

In another embodiment, a dye pattern can be transferred to an issuing extrudate. For example, extruded plastic sheet 30, issuing from die 26, via die orifice 28, is contacted with laminate base material web 34 on one side thereof and with polyethylene coated heat transfer paper 42 on the other side thereof, in the nip of pressure roll 36 and cooling roll 38, as shown in FIG. 2. Web 34 is fed from supply roll 32 to pressure roll 36 and heat transfer paper 42 is fed from supply roll 40 to roll 38 where said web 34 and paper 42 are contacted with the still-hot extruded sheet 30 under the pressure of said nip and all three sheets are bonded together at a temperature sufficiently high to sublime the dyes from the paper 40 to the receptor extrudate 30, thence said bonded sheets are passed around cooling roll 38 wherein the respective sheets are cooled below their softening temperatures as shown in FIG. 2. The cooled sheets are then separated by passing the laminate of sheet 30 and web 34 around striping roll 43A to wind up roll 44 while the polyethylene coated paper 42 is readily separated and passed around guide roll 46 to collection roll 48.

Thus, the present invention provides a method for ready and accurate transfer of dyes, prints, patterns, colors and the like, all defined herein as dye patterns, from dye carrier web to the dye receptor surface in a novel low cost process to achieve a dyed plastic material of high clarity reproduction. The transferred dyes are especially vivid because the dye carrier medium, e.g., polyethylenes, screens out impurities, e.g., dye adhesives, transfer agents and the like. The sotransferred dyes, due to the heat and pressure applied, penetrate below the surface of the dye receptor and will not rub or wear off.

As discussed above, the invention employs a heat transfer paper, a dye carrier layer and a dye receptor at a desired temperature and pressure range to achieve the uniquely colored plastics of the present invention.

By "layer" or "web" as used herein, is meant sheet, film or coating.

The dye transfer web can be any of the numerous dye imprinted webs (paper, foil or film, e.g., polyolefins, including polyethylene now available), including those numerous papers in use in transferring dyes and dye patterns in the fabric and textile industry.

The dyes can be of various dyes, including dispersed dyes, capable of sublimation of 200° F. and up, including those dyes in use on heat transfer papers for dye transfer in the textile industry.

The inert die carrier layer serves to separate the dye transfer web from the dye receptor surface, yet it does not adhere (except releasably) to the dye receptor surface following the heat transfer. The inert die carrier layer includes materials which have the following properties:

1. Capable of allowing the passage of dye from the transfer web to the dye receptor surface, at the dye sublimation temperature, without distorting the dye and, consequently, the design.

2. Does not significantly absorb the dye in its passage to the dye receptor surface, at the dye sublimation temperature.

3. Does not adhere to the dye receptor surface under conditions most suitable for dye transfer and/or dye transfer and product lamination. More specifically, the inert die carrier layer should not stick to the dye receptor surface at the temperature and pressures that the dye sublimes to the dye receptor. Moreover, where it is desired to accomplish dye transfer and lamination into product in a single operation, the inert die carrier layer shuld not stick to the dye receptor surface under the conditions of a laminating press cycle or an extruder lamination process or other lamination process.

The dye carrier web herein is preferably sheets, including films of polyolefins and, most preferably, polyethylene film. By polyolefin, as used herein, is meant polymers derived from unsaturated hydrocarbons, which include all the addition polymers having, as a base unit, at least two adjacent bonded carbon atoms, including polymers of ethylene, the alkyl derivatives of ethylene and its dienes.

To illustrate, an unsaturated hydrocarbon represented by $$-C=C-$$

undergoes additional polymerization to obtain polyolefins which include:

$$(C-C)_n$$

where "C" is carbon and "n" represents a plurality of ethyl units in a polymer.

The following are examples of specific polyolefins, all suitable as a dye carrier web in the present invention:

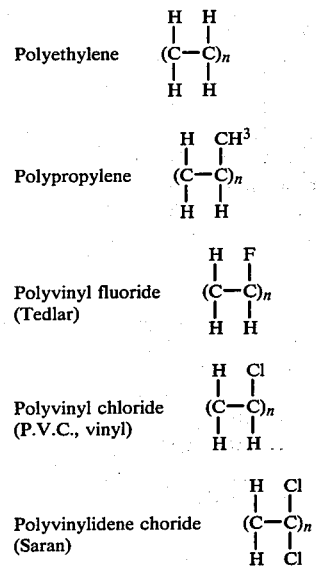

where "H" is hydrogen, "F" is fluoride and "Cl" is chloride.

Two other examples of polyolefins, each suitable as a dye carrier web in the present invention, are ionomer resins and plastics and isoprene resins and plastics.

The polyolefin dye carrier and the dye receptor should be of sufficiently dissimilar properties so as not to adhere during or after the dye transfer step.

A preferred polyolefin is polyethylene, such as polyethylene film, which has been readily available at low cost.

The die carrier layer employed in the process of the invention is a sheet or film that is mechanically placed between the transfer print web and the dye receptor surface, or as a secured coating of 0.1 mil to 4.0 mils to 10.0 mils or more in thickness on the printed face of the heat transfer web. A paper can be readily achieved at the end of a printing line by a solvent or emulsion base polyethylene coating step or by an extrusion coating step.

It will be readily understood, by those in the art, why polyolefins and, particularly, polyethylene do not adhere to plastic materials of the type used in decorative products or laminate products herein. Basically, polyethylene is a good releasing material of a different chemical nature than the normal components of a decorative product, as defined below. However, the fact that polyethylene allows the transmission of sublimed dyes without significant absorption or distortion of the dye is a wholly novel and unexpected development.

In the process of this invention, the dye receptor can be any material, such as thermoplastics, which will absorb sublimed dyes and will not adhere to the inert die carrier medium when the materials are separated. The dye thermoplastic receptor materials suitable for the present invention include: polycarbonates, vinyls, acrylics, polystyrene, A.B.S. (Acrylonitrile Butadiene Styrene) and like extrudable polymers. The present invention also applies to thermoset plastics as discussed hereinafter.

The temperatures necessary to effect dye transfer and absorption in the present invention have been found to be governed by the temperatures required for dye sublimation and the temperatures at which the dye receptor surface energy level rises to become susceptible to dye penetration, which can be at or below the softening temperatures therefor. These temperatures have been found to be 230° F. to 450° F. and up, depending on the materials employed. After the dye transfer is completed, the materials are cooled below the plastic softening temperatures, if necessary, and the applied pressure released and the materials separated, e.g., heat transfer paper and dye carrier web, which usually adhere, are readily separated from the dye receptor web.

In the case of the dye carrier web, i.e., the polyolefin web, it has been found that such a web permits the passage of sublimed dyes therethrough (to the dye receptor) whether said web is above, at or below its respective softening point. For example, polyolefins such as high melting point polypropylene (332° F.) and polyvinyl fluoride (392° F.) will generally be effectively employed in the present dye transfer process at temperatures below their respective softening points. Accordingly, the choice of the polyolefin dye carrier web will determine whether such web will, in addition to its regular dye transmitting function, serve to texturize the dye receptor surface or have little or no effect on the same during the dye transfer step of the present invention.

By "texturize" is meant to transmit the surface pattern, characteristics and/or profile from the dye carrier surface to the adjacent dye receptor surface (suitably heated as stated herein). For example, a dye carrier having raised and indented surfaces will texturize the adjacent dye receptor surface (suitably heated) by embossing the same with its profile "stamp". In another example, a dye carrier having a smooth surface will texturize the adjacent dye receptor surface by imparting a smooth surface thereto.

Thus (a) if the softening point of the polyolefin dye carrier web is lower than the softening point of the dye receptor, such dye carrier will not texturize the surface of the dye receptor (but such web will itself be texturized by the dye receptor surface). The dye receptor surface will retain its original surface finish after the dye transfer step.

(b) If the softening point of the polyolefin dye carrier web is higher than the softening point of the dye receptor, such dye carrier will texturize the surface of the dye receptor. Such higher softening points webs can be purposefully textured (matte, gloss, satin, embossed and the like) so that the heated (and softened) dye receptor surface is texturized during the dye transfer step.

If it is desired to laminate the reverse side of the dye receptor to another material, as discussed above, the lamination can be carried out concurrently with the dye transfer step in the above temperature range of 230° F. to 450° F., depending upon the substrate employed. After dye transfer and lamination occur, the materials are cooled and separated as discussed above.

In the applied pressures necessary to effect dye transfer and absorption, 1 to 5 psig has been found sufficient. Lamination pressures, however, run considerably higher, from 50 to 3,000 psig. In textiles, such lamination pressures would be too great in the conventional dye transfer to cloth process and would result in the heat transfer paper adhering to the dye receptor cloth. However, in the present invention, utilizing the above described dye carrier layers, such adhesion is prevented and pressures of from 1 to 3,000 psig can be employed to obtain either high clarity dye transfer or dye transfer and, concurrently, lamination of the dye receptor to a substrate. A preferred pressure range for dye transfer or dye transfer and lamination is 1 to 300 to 3,000 psig.

The laminate base materials referred to herein include treated papers, fabrics, plastic materials, including thermoplastic film and sheets and any other material bondable to the plastic dye receptor.

The following table serves to exemplify the method and products of the present invention as to materials, pressures and temperatures employed.

TABLE I

| Dye Receptor Surface | Laminate Base Material | Laminating Pressure | Laminating Temperature |
|---|---|---|---|
| 2 mil Vinyl Film (clear) | Acrylic Resin Impregnated Kraft | 150 psig | 300° F. |
| 3 mil Acrylic Film (clear) | Acrylic Resin Impregnated Kraft | 150 psig | 300° F. |
| 3 mil Acrylic Film (clear) | Phenol-Formaldehyde Treated Kraft | 1000 psig | 300° F. |
| 3 mil Acrylic Film (clear) | Vulcanized Fiberboard | 150 psig | 300° F. |
| 3 mil Acrylic Film (white) | Low Density Hardboard | 50 psig | 300° F. |
| 3 mil Acrylic Film (white) | High Density Hardboard | 150 psig | 300° F. |
| 2 mil Vinyl Film (clear) | A.B.S. Plastic | 20 psig | 270° F. |
| 20 mil Polycarbonate (clear) | Polycarbonate (white) | 200 psig | 360° F. |
| 2 mil Acrylic Film | C.A.B. Plastic | 30 psig | 260° F. |

TABLE I-continued

| Dye Receptor Surface | Laminate Base Material | Laminating Pressure | Laminating Temperature |
|---|---|---|---|
| (clear) | (Cellulose Acetate Butyrate) | | |
| 3 mil Styrene (clear) | Styrene (opaque) | 30 psig | 280° F. |
| 3 mil Polyester (clear) | Treated High Density Hardboard | 150 psig | 300° F. |
| 3 mil Polyester (clear) | Polyester Treated Kraft | 200 psig | 300° F. |
| 2 mil PVF (clear) | Polyester Treated Kraft | 150 psig | 250° F. |

In all the above examples, the dye carrier web employed was unpigmented 2 mil polyethylene film.

II. Dye Transfer Absorption into Thermoset Plastics

According to present manufacturing methods, a thermosetting resin is impregnated into a carrier material (usually fibrous) and a catalyst or heat is applied to effect cure of the resin and obtain the final thermoset plastic product.

Attempts to decorate such thermoset products have proved unsatisfactory. Thus, in the case of kitchen counter top formica-like material, the carrier material, usually a blotterlike paper, is imprinted with a grain or other design, the paper impregnated with a thermoset resin and heat and pressure applied to cure and set the end product. The problem is that paper good for blotting absorption is bad for clear printing or sharp definition. Accordingly, a coarse decorative design results, which is partially obscured by a coating of thermoset plastic.

Similarly, in making thermoset dinnerware, a design is applied to the blotting paper substrate, often by a silk screen process. Again, a design of coarse resolution results.

It has been found, however, that the dye transfer process of the present invention readily applies to decorate and penetrate thermoset plastics with vivid designs and decorations of high clarity of definition.

Examples of such thermoset plastics are melamine and phenol/formaldehyde, polyesters, alkyds, epoxies and urethanes.

As taught by the present invention, dispersed dyes are transferred from the dye transfer web through the polyolefin dye carrier web to the thermosetting resin while it is in the curing stage. Generally, the heat applied to cause the dyes to sublime is also sufficient to cause the resin to cure to a thermoset plastic.

In such process, the resin substrate, e.g., blotting paper, may be as coarse as desired since the dyes are printed on excellent substrate, e.g., heat transfer paper. Then, in the curing and dyeing stage, dyes are transmitted to the curing plastic receptor surface, free of impurities to penetrate same in bright hued, sharp, fine designs of high definition.

In such dye transfer processes, because of the soft, tacky nature of uncured thermoset resins, it is frequently necessary to employ polyolefin dye carrier webs having high softening temperatures, i.e., webs that will not soften (and flow into the uncured thermoset resins with consequent bond problems) below or at the dye sublimation temperature and at the curing temperature applied to the thermosetting resins. These stable webs will impart a texture to the thermoset resins in contact therewith and such webs can be textured according to a desired end result.

Figure 3:
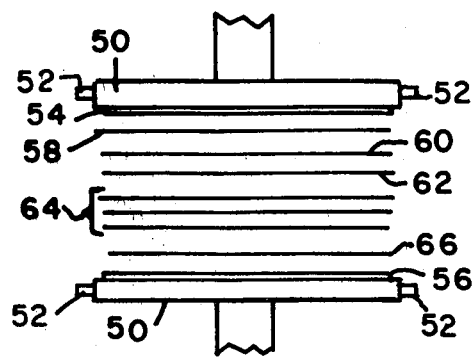
Figure 4:
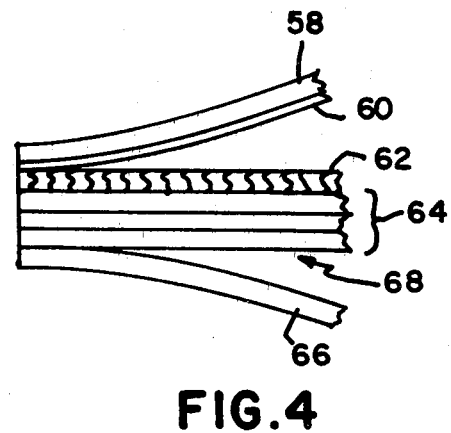

An example of decorating, curing and texturizing a thermoset resin according to the present invention is shown in the drawings wherein:

FIG. 3 is a partial sectional elevation view of the dye transfer and curing system embodying the present invention; and FIG. 4 is an elevation view of the laminate product made in the apparatus shown in FIG. 3.

Referring in detail to the drawings, platens 50 heated by steam or oil and cooled by water via ducts 52 has positioned therebetween, smooth surfaced press platens 54 and 56, heat transfer paper 58, polyethylene dye carrier layer 60, the dye receptor 62 laminate backing layers 64 and a release sheet 66 as shown in FIG. 3.

The dye receptor 62 is a thermosetting resin (e.g., melamine formaldehyde) impregnated in a paper layer. The laminate backing layers 64 are layers of thermosetting resin impregnated paper. Hydraulic rams 49 press the platens and above layers to a desired pressure. Heat is applied to the platens 50 to heat the stack of pressed layers sufficient to sublime the dyes from the heat transfer paper 58 through the dye carrier layer 60 into the dye receptor 62, the resin of which is shortly thereafter cured by the heat so applied and at the same time said heat causes curing and bonding of the (above mentioned adjacent) laminate backing layers 64 as shown in FIGS. 3 and 4. Further, the texture of the dye carrier layer 60 is applied to the curing resin surface of the dye receptor.

Subsequently, the platens 50 are cooled to cool the stack of layers, including the dye carrier layer, after which the platens are opened and the heat transfer paper 58 and the dye carrier layer 60, herein called the dye transfer laminate, is readily removed from the dye receptor 62, and the release sheet, e.g., silicone coated paper 66, is removed, leaving the decorated, laminated product 68, embodying the invention as shown in FIG. 4. The product 68 has texturized and decorated thermoset layer 62 bonded to laminate backing layers 64.

Thus, the present invention provides for ready decorating, texturizing, curing and laminating of thermoset plastics. Of course, where desired, the laminate backing layers can be dispensed with and a dye receptor of any thermosetting resin composition, with or without fiber carrier, can be employed within the scope of the present invention.

Various thermosetting resins can be employed in the above process as previously described herein. Various dye transfer webs and dye carrier webs previously described herein can be employed with the above process.

The laminate backing layer or layers can be of any thermoset plastic, e.g., phenol formaldehyde, polyester resin treated Kraft paper (alkaline sulfate paper) or other thermoset plastics.

The temperatures employed in the above process to accomplish dye sublimation, resin curing and lamination have been found to be between 230° F. to 450° F., depending on the materials employed. A commonly employed temperature range is between 280° F. to 350° F.

The pressures applied in the above process is between 5 to 300 psig, which pressures are sufficient for dye transfer and for compacting the thermoset layers. However, for certain lamination requirements, pressures from 5 to 3,000 psig can be employed as long as a resin layer remains on the top or decorated side of the dye receptor.

The time employed in the above process can be the time long enough to heat the layers up to the desired temperatures to effect dye sublimation, e.g., 1 to 60 seconds or more, once the proper temperature is reached and curing of resin and lamination, e.g., 5 seconds to 5 minutes or more once the temperature is reached.

The same criteria above apply when thermoplastics (described above) are substituted for the thermosetting resins except the curing step is omitted.

III. In-Mold Decoration of Plastic Articles.

It is often desirable and economical to print or decorate molded plastic articles while they are being formed in the mold.

According to previous methods, a sheet of printed paper, foil or film is placed in the mold cavity where it becomes adhered to and part of the plastic article or shape. The paper, foil or film must be made of or treated with a plastic that is compatible, i.e., adherable to the plastic article being formed so it will adhere to the finished article. Such surface decoration of articles encounters drawbacks which include:

(a) adhesion problems between the sheet and the plastic article, which appear right after the molding step or some time later;

(b) excess flash of plastic around the sheet which must be removed after the molding step;

(c) the printable sheet is of relatively expensive paper, foil or film; and (d) the texture of the decorated area is determined by the surface characteristics of the mold.

In another previous method, the molded article is surface decorated afterward, e.g., by hand painting.

It has been found that the dye process of the present invention readily applies to in-mold decoration and penetration of plastic articles with vivid, clear patterns.

According to the present invention, a dye transfer web (e.g., a heat transfer paper) in contact with a polyolefin dye carrier web is positioned on the mold, polyolefin side out. In the case of thermoplastics, a plastic blank is then placed in the mold. The mold is closed and heat and pressure are applied to the blank to press same against said dye carrier web and the mold walls. Sufficient heat is applied to cause the dyes in the dye transfer web to sublime through said dye carrier web to decorate (including print) and penetrate the adjacent surfaces of the blank, to thus mold and decorate a plastic article. The mold is then cooled and opened and the article released and the cycle repeated.

In the case of thermosetting resin, the resin or the resin impregnated carrier is placed in the mold in place of the thermoplastic blank and the above process repeated. The heated dyes sublime into the adjacent resin surface and the applied heat then serves to cure the resin into a thermoset plastic molded article.

The in-mold decorating process of the present invention applies to various molding processes, including drape forming, vacuum forming, thermo forming (including matched die molding, blow molding and injection molding).

Generally, a dye transfer layer such as a heat transfer paper in contact with a polyolefin dye carrier layer is positioned in the mold employed, polyolefin side out. The plastic (either a thermoplastic or a thermosetting resin) blank, form, sheet, parison and the like is placed in the mold, the mold closed and heat and pressure applied to mold and decorate the article as aforesaid. Alternatively, the above layers are placed between mold halves, which are pressed together and the process repeated, as illustrated, for example, in FIG. 6.

A plastic article decorated by the above method of the invention, has printing or well defined and clear decorated designs that are absorbed into the plastic. The decoration has a physical (wear) and chemical (solvents, detergents) resistance equal to that of the plastic article itself. The decoration on the article, due to lack of adhesive and other impurities, is of pure dispersed dye or dyes and is vivid, clear and sharply defined. Additionally, a desired texture, including a continuous uniform texture, can be applied to the plastic article from the polyolefin dye carrier web as previously discussed.

The dye transfer laminate, e.g., heat transfer paper and polyethylene, can be positioned in a mold in three ways:

(a) physically fitting the laminate therein;

(b) mechanically, as by clamps; and (c) electrostatically, as by an electric charge.

An example of in-mold forming and decorating of plastic articles according to the present invention is shown in the drawings, wherein:

FIG. 5 is a sectional elevation view of the molding and dye transfer apparatus according to the present invention;

FIG. 6 is an elevation view of the product molded in the apparatus of FIG. 5, and FIGS. 7 to 12 illustrate in-mold decorating of a blow molded article.

Referring in detail to the drawings, in a thermo forming operation, a stretchable dye transfer layer, in this case a dye printed polyolefin film 70, in contact on the printed side thereof with a dye carrier layer of polyethylene 72 is placed adjacent a carrier (e.g., fiberglass, fibers or paper) impregnated with a thermosetting resin 74 surmounted with an excess resing 76 between the matched halves of a mold, heated dies 78 and 80 as shown in FIG. 5. The mold dies 78 and 80 are then closed upon the above layers (by pressure means 82) which are compression molded thereby and heat is applied to said dies (by means not shown). The compression of said dies causes the heated resin impregnated web to bend and flow to the mold shape. Again, the applied heat transfers dyes into the resin which then cures to a thermoset plastic part or article.

The mold dies are then cooled (by means not shown), the mold is opened and the formed layers ejected. Thereupon the dye transfer laminate 84 readily separates from the formed and decorated plastic part 86 as shown in FIG. 6.

A variety of shaped panels, parts and articles of thermoset plastics or thermoplastics are formed and decorated by the above method within the scope of the present invention. Examples are motor vehicle panels and parts, including fenders, marine parts, ceiling panels, containers and the like.

Accordingly, the present invention provides for ready in-mold formation and decorating of plastic articles.

As indicated, the dye transfer carrier should be on stretchable web where a bent or curved article is to be molded with a well defined and clear pattern.

Examples of thermoset resins employed are melamine, formaldehyde, phenol formaldehyde, polyester resins, epoxies, polyamides, polyimides and polyurethanes.

The thermoset resins employed herein can be impregnated into carrier webs such as fiberglass matting, non-woven fabrics of natural (e.g., cellulose fibers) and synethic fibers.

In place of the above thermoset plastics and carrier webs, the thermoplastic dye receptors previously disclosed herein can be employed, for example, polyolefins, polystyrene and vinyls as well as acetal.

In addition, sheet molding compounds (SMC) are particularly useful in matched die molding and decorating of articles, such compounds are materials which include thermoplastic or thermosetting resins impregnated or saturated in a carrier web, e.g., an absorbent non-woven fabric, a paper or a cloth.

The temperature and pressure ranges applied and the time periods needed for the above method are as disclosed above in the previous method description in connection with FIGS. 3 and 4.

In another embodiment, the in-mold decoration of the present invention readily applies to blow molding of thermoplastic articles. Again, the dye transfer layer (e.g., of paper, foil or film) 91 is placed in close contact with a polyolefin layer 93 to form a dye transfer laminate 92, as shown in FIG. 12. A pair of dye transfer laminates 92 and 94 are positioned in the open mold halves 88 and 90 and a blow molding mandrel 96 inserted there between as shown in FIG. 7.

A tubular die 98 extrudes a hollow platic parison 100 over the mandrel 96 as shown in FIG. 8. The mold is closed around the parison 100 and mandrel 96 (sealing off the former) as shown in FIG. 9. High pressure air is then admitted into the mandrel to blow the parison against the walls of the mold and against the dye transfer laminates 92 and 94 to form a bottle as shown in FIG. 10. The hot extruded plastic parison on contacting the dye transfer laminates 92 and 94 heats the same into the dye transfer layer 91 to vaporize and sublime through the polyolefin to penetrate and decorate (including print) the respective adjacent bottle surfaces. The mold is then cooled to bring the bottle below its softening temperature, the decorated bottle 102 is ejected as shown in FIG. 11 and the cycle recommenced.

By the above process of the invention, numerous hollow thermoplastic articles, including bottles, toys, containers and the like, are readily molded, decorated with a well defined and clear pattern and texturized (where high softening temperature dye carrier web is employed).

The various thermoplastics described herein may be employed in the above process as dye receptor (parison), dye transfer webs (plus paper, foil and sheet) and dye carrier webs.

The temperatures at which the above method is performed will be governed by the extrusion temperatures of the plastic employed and the sublimation temperature range of the dispersed dyes used therein.

IV. Post-Pressure Dye Transfer:

This portion of the disclosure relates to continuous or in-line dye absorption into plastics utilizing post-pressure dye absorption into plastic methods.

Previous methods of printing, decorating and labeling plastics, including sheets and articles, have required concurrent application of heat and pressure, as previously described, causing the pressure applying means to be tied up during the heating cycle and limiting the production rate of such methods.

The post-pressure method of the present invention decreases the use time of the pressure applying means and greatly increases the production rate thereof. Broadly, the method provides for rapid transfer of dye patterns to a plastic dye receptor, which includes positioning a dye transfer web and a polyolefin dye carrier web in close contact. The other side of the dye carrier web is contacted with the surface of the dye receptor and passed to a heat and pressure zone where sufficient pressure and heat are applied thereto to releasably bond the dye receptor and the webs together in a tri-laminate. The tri-laminate is passed from the pressure zone into a post-pressure heating zone, heated to a temperature sufficient to sublime the dyes from the dye transfer web through the dye carrier web and into the surface of the dye receptor. The tri-laminate is then cooled below the softening temperature of the components thereof and the webs are separated from the dye receptor.

Figure 13:
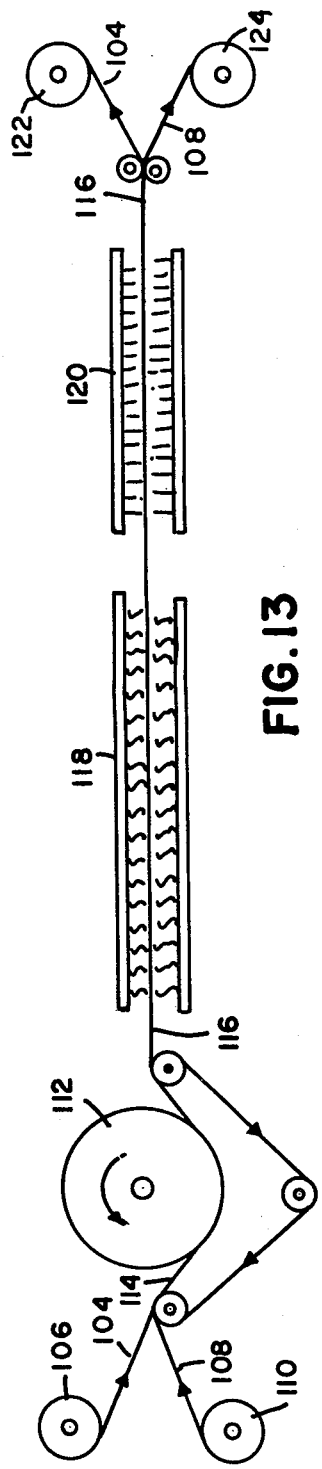
Figure 14:
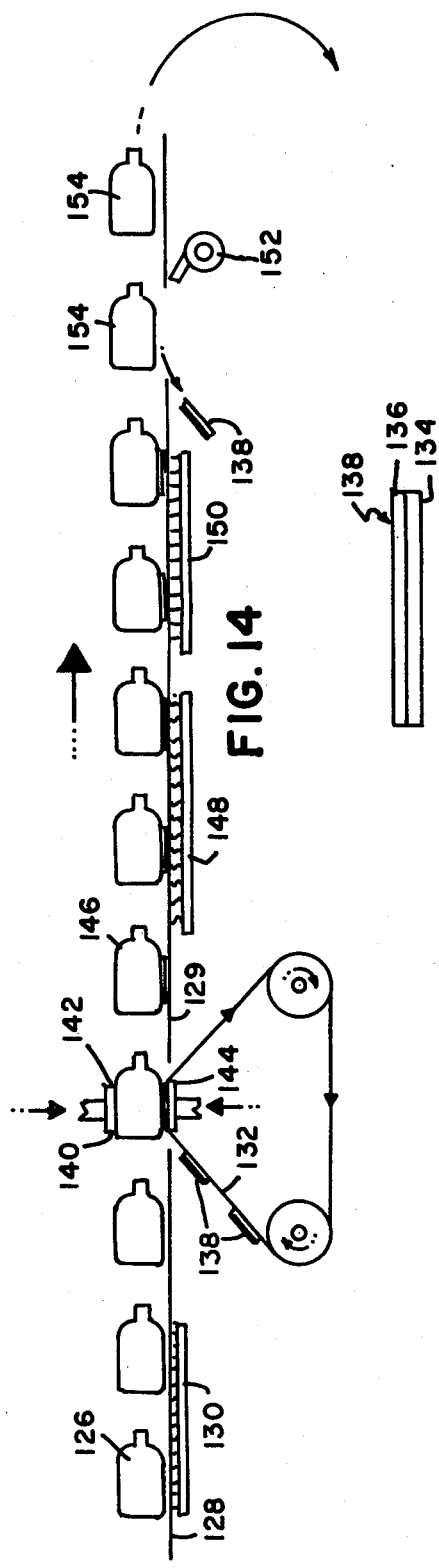
Figure 15:
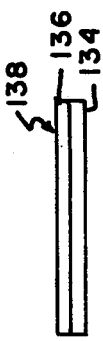

The above invention will become more apparent from the following detailed specification and drawings in which:

FIG. 13 illustrates the in-line continuous plastic decorating process embodying the present invention;

FIG. 14 illustrates another continuous plastic decorating process embodying the present invention; and FIG. 15 illustrates a component employed in the process of FIG. 14.

Referring to details in the drawings, heat transfer paper coated with a polyolefin dye carrier layer, herein dye transfer laminate 104, is passed from a supply roll 106 into contact with dye receptor sheet 108, fed from supply roll 110 as shown in FIG. 13. The laminate 104 and sheet 108 are then passed into contact with heated cylinder 112 under the pressure of endless pressure belt 114, herein a heat and pressure zone, where the laminate 104 and the dye receptor sheet 108 are releasably bonded together in a tri-laminate 116 as shown in FIG. 13.

The tri-laminate 116 is then passed from the heat and pressure zone into the post-pressure heating zone 118 where the tri-laminate 116 is heated to or maintained at a temperature sufficient to sublime the dyes from the heat transfer paper, through the polyolefin layer and into the dye receptor 108 to decorate (including print) and penetrate the same as shown in FIG. 13. The tri-laminate 116 is then passed through a cooling zone 120 which cools it below the softening temperatures of the respective layers thereof and the dye transfer laminate 104 is separated from the dye receptor sheet 108; the laminate proceeds to wind-up roll 122 and the dyed sheet passed to wind-up roll 124 as shown in FIG. 13.

In another embodiment of the post-pressure method of the invention, spaced plastic bottles 126 on conveyor belt 128 are conveyed over surface preheater 130 for heating of the surface thereof to a pressure stage 140 as shown in FIG. 14. On a converging line 132, a series of dye transfer laminates 138, which include heat transfer paper 134, surmounted by polyolefin layers 136, are advanced also to the pressure stage 140, as shown in FIGS. 14 and 15. The laminate 138, polyolefin side up, contacts the heated surface of the plastic bottle 126 therein under the pressure of heated platen 144 and platen 142, which closes thereon to form a tri-laminate 146 as shown in FIG. 14. The heat and pressure applied by the respective platens 144 and 142 are sufficient to releasably bond the tri-laminate 146.

The platens 144 and 142 open and the tri-laminate 146 is conveyed on belt 129 over post-pressure heater 148, where the tri-laminate is heated to a temperature sufficient to sublime the dyes from the heat transfer paper through the polyolefin layer and into the adjacent surface of the bottle 126 to decorate (including print) and penetrate the same, as shown in FIG. 15. The tri-laminate 146 is then conveyed over a cooling stage 150, where the respective components are cooled below their softening temperatures as shown in FIG. 14. The cooled tri-laminate 146 is conveyed past air jet doctor 152, which separates the dye transfer laminate 138 from the decorated and penetrated bottles 154, which is conveyed to storage or other processing as shown in FIG. 14.

The post-pressure dye transfer method of the invention provides a rapid continuous production process with little pressure stage delay. Such method is highly suitable for thermoplastic articles, e.g., sheets, such as vinyl, acrylic, polyester and the other thermoplastics mentioned herein. Further, this method is suitable for thermoplastic articles, such as various bottles, containers (e.g., cosmetic containers) and other production line plastic articles, including parts.

Sufficient heat is applied at the preheating state, e.g., of FIG. 14, to heat up the surface of the dye receptor to a temperature range of about 130° F. to 350° F.

The pressure applied, e.g., at belt 116 in FIG. 13 and platens 144 and 142 in FIG. 14, is in the range of 0.1 psig to 50 psig or more and frequently in the range of 1 to 10 psig. The tri-laminate is heated to between 140° F. to 350° F. or more (depending on the materials employed) to effect releasable bonding at the respective pressure stages discussed above.

The duration of application of heat and pressure to releasably bond the tri-laminate is seconds, depending on the materials bonded; for example, between 0.1 to 10.0 seconds or more.

The temperatures applied in this post-pressure stage to cause dye sublimation is as previously described, e.g., 230° F. to 450° F.

Various heaters can be employed in the above pressure process, e.g., convection or radiation heaters, including electric, gas and the like.

It is claimed:

1. A dye decorated article comprising a plastic web penetrated with dispersed dye therein in a clearly defined pattern, the penetrated side thereof being free of dye adhesive and dye carrier.

2. The article of claim 1 wherein said web is substantially non-porous therein.

3. The article of claim 1 wherein said web is of thermoplastic.

4. The article of claim 1 wherein said web is of thermoset plastic.

5. The article of claim 4 wherein said web is a thermosetting resin with fibrous carrier material therein.

6. The article of claim 1 laminated to a substrate on the reverse side of said web.

7. The web of claim 1 having a texture pattern embossed therein on the decorated side thereof.

8. A dye decorated plastic article comprising a three dimensional member having at least one surface penetrated with dispersed dye in a pattern, the penetrated surface thereof being free of dye adhesive and dye carrier.

9. The article of claim 8 wherein said surface is substantially non-porous and said pattern is clearly defined thereon.

10. The article of claim 8 being of thermoplastic.

11. The article of claim 8 being of thermoset plastic.

12. The article of claim 8 being a deformed or molded plastic body.

13. The article of claim 12 being a blow molded plastic article.

14. A dye decorated article comprising a plastic body penetrated with dispersed dye therein in a clearly defined pattern through a separator web.

15. The article of claim 14 comprising a plastic body penetrated with dispersed dye therein in a clearly defined pattern from a dye transfer web through a polyolefin separator layer to and into said body.

16. The decorated article of claim 15 comprising a plastic body penetrated with dispersed dye in a clearly defined pattern from a heat transfer paper through a polyolefin separator layer into said body.

17. The dye decorated article of claim 15 comprising a plastic body penetrated with dispersed dye in a clearly defined pattern from the heat transfer layer through a polyolefin separator layer, the layers being contacted with said body under sufficient pressure and temperature to effect dye pattern penetration into said body.

* * * * *